US010971957B2

(12) United States Patent
Manzi

(10) Patent No.: US 10,971,957 B2
(45) Date of Patent: Apr. 6, 2021

(54) METHOD FOR SUPPLYING ENERGY WIRELESSLY THROUGH RADIO FREQUENCY IDENTIFICATION, RFID, AND RFID SYSTEM

(71) Applicant: ams AG, Premstaetten (AT)

(72) Inventor: Giuliano Manzi, Premstaetten (AT)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 16/765,639

(22) PCT Filed: Nov. 22, 2018

(86) PCT No.: PCT/EP2018/082192
§ 371 (c)(1),
(2) Date: May 20, 2020

(87) PCT Pub. No.: WO2019/105834
PCT Pub. Date: Jun. 6, 2019

(65) Prior Publication Data
US 2020/0303969 A1    Sep. 24, 2020

(30) Foreign Application Priority Data

Nov. 29, 2017 (EP) ..................................... 17204337

(51) Int. Cl.
*G06K 7/01* (2006.01)
*H02J 50/80* (2016.01)
(Continued)

(52) U.S. Cl.
CPC ............ *H02J 50/80* (2016.02); *G06K 7/0008* (2013.01); *G06K 7/10158* (2013.01);
(Continued)

(58) Field of Classification Search
CPC ........ H02J 50/80; H04W 4/80; G06K 7/0008; G06K 7/10158; G06K 19/0723; H04B 5/0062
See application file for complete search history.

(56) References Cited

U.S. PATENT DOCUMENTS

| 6,289,237 | B1 | 9/2001 | Mickle et al. |
| 6,388,562 | B1* | 5/2002 | Takiguchi ............ G06K 7/0008 235/375 |
| 7,027,311 | B2 | 4/2006 | Vanderelli et al. |
| 7,274,284 | B2* | 9/2007 | Dressen ............... G06K 7/0008 235/451 |

(Continued)

FOREIGN PATENT DOCUMENTS

| EP | 1069526 | 1/2001 |
| EP | 3182609 | 6/2017 |
| WO | 2001/95242 | 12/2001 |

OTHER PUBLICATIONS

European Patent Office, International Search Report for PCT/EP2018/082192 dated Feb. 20, 2019.

*Primary Examiner* — Munear T Akki
(74) *Attorney, Agent, or Firm* — MH2 Technology Law Group LLP

(57) ABSTRACT

In an embodiment a method for supplying energy wirelessly through RFID comprises the steps of sending by an RFID reader device a request message to at least one RFID tag device, receiving by the at least one RFID tag device the request message, sending by the at least one RFID tag device an answer message to the RFID reader device and changing by the at least one RFID tag device its state into a high power mode, receiving by the RFID reader device the answer message, sending by the RFID reader device an energizing signal having an unmodulated constant wave at a predefined frequency during an adjustable amount of time, receiving by the at least one RFID tag device the energizing signal, converting said signal into energy and using the energy by the at least one RFID tag device, and changing by the at least (Continued)

one RFID tag device its state into an RFID operation mode at the end of the adjustable amount of time.

13 Claims, 3 Drawing Sheets

(51) Int. Cl.
 H04W 4/80 (2018.01)
 G06K 7/00 (2006.01)
 G06K 7/10 (2006.01)
 G06K 19/07 (2006.01)
 H04B 5/00 (2006.01)

(52) U.S. Cl.
 CPC ....... G06K 19/0723 (2013.01); H04B 5/0062 (2013.01); H04W 4/80 (2018.02)

(56) References Cited

U.S. PATENT DOCUMENTS

| | | | |
|---|---|---|---|
| 7,643,312 B2 | 1/2010 | Vanderelli et al. | |
| 7,880,587 B2* | 2/2011 | Amtmann | H04L 12/413 340/10.2 |
| 8,994,501 B2* | 3/2015 | O'Haire | G06K 7/10158 340/10.1 |
| 2004/0036575 A1* | 2/2004 | Patterson | G06K 7/10019 340/10.3 |
| 2006/0022042 A1* | 2/2006 | Smets | G06K 7/0008 235/451 |
| 2006/0273176 A1* | 12/2006 | Audebert | G06K 19/07336 235/451 |
| 2006/0283960 A1* | 12/2006 | Top | G06K 19/07309 235/492 |
| 2008/0100439 A1* | 5/2008 | Rinkes | G06K 7/10217 340/572.1 |
| 2011/0285511 A1 | 11/2011 | Maguire et al. | |
| 2015/0186693 A1 | 7/2015 | Blair et al. | |

* cited by examiner

METHOD FOR SUPPLYING ENERGY WIRELESSLY THROUGH RADIO FREQUENCY IDENTIFICATION, RFID, AND RFID SYSTEM

The field of this application concerns Radio Frequency Identification, RFID, especially the wireless supply of energy using RFID. The energy is supplied to a sensor, for example.

BACKGROUND

Recently, an increasing interest in sensing solutions has occurred and a trend toward pervasive sensing can be observed. Many sensor solutions are integrated or embedded into electronic devices, cars, wearables, garments, small objects, plants, field, houses and the like. At the same time an increase in wireless interfaces can be observed. The so-called pervasive electromagnetism discipline is getting more and more attention. Said pervasive electromagnetic aims at providing the physical layer of the emerging Internet of Things that enables the Internet to get into the real world of physical objects.

A device providing sensing capability is known as a sensor. In case said sensor is equipped with an electronic label identifying the sensor is turned into a digital entity readable from remote through RFID, i.e. using RFID. Such device is called a wireless sensor. In fact, RFID technology may be regarded as the natural support or medium to achieve remote identification and communication with a resulting sensor label or sensor tag.

Neither active, passive nor semi-passive RFID based wireless sensors will be able to keep energized during their entire life cycle with a very small battery or any other kind of energy storage. In view of a cost effective and easily deployable solution, wireless sensors are supposed to require very limited maintenance during their entire life cycle, ideally only the installation work. The life cycle of wireless sensors can be several years, up to ten or more in the case of a wireless sensor embedded in the concrete structure of a building, for example. Consequently, one of the main issues in the application of wireless sensors is their power management. State of the art wireless sensor systems require relatively expensive maintenance for battery replacement and/or maintenance of the recharging system as well as the power supply system via power networks.

Known solutions for wireless charging of such sensors are focusing on the rectification of an incoming radio-frequency, RF, signal which can be modulated or unmodulated, to a direct current, DC, voltage assuming that the incoming signal is a constant wave at a certain frequency. Unfortunately this last point is not how communication systems using the Industrial, Medical, Scientific, ISM, frequency band according to defined standards communicate. Most ISM based systems, like RFID, use some form of amplitude-shift keying, ASK, like e.g. phase-reversal, PR-ASK, when transmitting data using RF signals between reader and tag. The efficiency of converting these alternate current, AC, RF signals to DC signals is limited by the level of modulation used during the data transmission. Therein, typical amplitudes vary from 100% to 0-10%. Consequently, if the signal level is below 10%, nearly no conversion occurs and the system is unable to produce the necessary DC voltage.

The definitions as described above also apply to the following description unless stated otherwise.

SUMMARY

In one embodiment a method for supplying energy wirelessly through RFID comprises the following steps:

sending by an RFID reader device a request message to at least one RFID tag device, receiving by the at least one RFID tag device while being in an RFIP operation mode the request message, sending by the at least one RFID tag device while being in the RFIP operation mode an answer message to the RFID reader device and changing by the at least one RFID tag device its state into a higher power mode, receiving by the RFID reader device the answer message, sending by the RFID reader device an energizing signal having an unmodulated constant wave at a predefined frequency during an adjustable amount of time, receiving by the at least one RFID device the energizing signal, converting said signal into energy and using the energy by the at least one RFID tag device, changing by the at least one RFID tag device its state into the RFID operation mode at the end of the adjustable amount of time. Therein the request message comprises a first command which causes the at least one RFID tag device to change its state into the higher power mode. The request message further comprises information on the adjustable amount of time for the sending of the energizing signal.

By way of the unmodulated constant wave which is transmitted with the energizing signal from the reader device and is converted in the at least one tag device into energy during the high power mode, the efficiency of the conversion is higher compared to state of the art solutions. Consequently, the amount of energy generated in that way is higher. The method is based on an RFID system. It reuses the physical layer of said RFID system. Therefore, the proposed method enables a cost-effective wireless energizing of sensors and wireless sensors.

The RFID communication which is employed in the defined method is for instance of the type ultra-high frequency, UHF, RFID, and conforms to the related standards as defined in, for example, the ETSI EN 302 208-1 V1.4.1 as of 2011/11. The generated energy comprises a DC voltage, for example. The RFID reader device and the RFID tag device are prepared to conform to the related standards. The RFID reader device consequently fulfils the requirements of a reader or interrogator defined in said standards interrogator, while The RFID tag device fulfils the requirements of a tag or transponder specified in said standards.

Using the request message sent by the RFID reader device, a dedicated state is established in the at least one RFID tag device, i.e. the higher power mode. In this high power mode, the energizing signal is efficiently converted into energy. At the end of the adjustable amount of time during which the energy is generated, the at least one RFID tag device changes its state back into the RFID operation mode. In this mode messages are transmitted between the RFID reader device and the at least one RFID tag device according to the relevant standards as known by those skilled in the art.

Upon receipt of the request message the RFID tag device changes its state or operation mode from RFID operation mode to high power operation mode. The request message conforms, for example, to the request message as defined in the UHF RFID standards.

By the request message the at least one RFID tag device is informed about the amount of time during which it should stay in the high power mode and convert energy from the energizing signal. Said amount of time is adjustable, for example, in order to fulfill regional regulatory requirements and standard requirements. For instance, in the European region, said adjustable amount of time is, for instance, set to four seconds as defined in the above mentioned ETSI standard and limited by clause 8.6.3. In FCC regions, e.g. the US, the adjustable amount of time is set to a multiple of 0.4 seconds due to the channel hopping as defined in § 15.247. (i). The duration during which the constant wave is transmitted can consequently be adapted according to regulation or use requirements.

During the high power mode no communication using field modulation shall occur between the RFID reader and tag devices.

In a development the request message comprises a second command which causes the at least one RFID tag device to perform an operation on a sensor which can be connected to the RFID tag device. In this case the method further comprises the step of performing by the at least one RFID device said operation according to the second command.

By the second command the at least one RFID tag device is caused to perform the operation defined in the second command on a sensor which can be connected to the RFID tag device. Said operation may, for instance, amount to read data from the connectable sensor via one of the standard interfaces, for example, serial peripheral interface, SPI, or inter-integrated circuit, $I^2C$.

In a development the answer message comprises an acknowledgement signifying successful receipt of the request message.

In a development using the energy by the at least one RFID tag device comprises storing the energy in an energy storage device which can be connected to the at least one RFID tag device and/or providing the energy to a sensor which can be connected to the RFID tag device.

The energy storage device which is connectable to the RFID tag device, for example, comprises a capacitor. Additionally or alternatively to the storing of the energy in the energy storage device, the energy is provided to a connectable sensor. In case the sensor is connected to the RFID tag device, the resulting combination represents a wireless sensor. Usage of the energy is not only restricted to the high power mode. In fact, the energy generated during the high power mode can also be used during the RFID operation mode.

In a development the sending by the RFID reader device of the energizing signal comprises changing a transmission mode of the RFID reader device into a constant wave mode, turning on an RFID carrier signal in the RFID reader device and emitting said carrier signal representing the energizing signal.

The UHF RFID standard defines several transmission modes, one of which is the constant wave mode which is used in the currently defined method for transmitting the energizing signal.

In a development the converting of the energizing signal into energy comprises rectifying the energizing signal and providing a direct current signal from this rectifying.

For the rectification of the energizing signal well-known rectifiers based e.g. on semiconductor diodes are employed. The direct current signal, which is generated by the described energy harvesting or energy scavenging during the high power mode, comprises a DC voltage, for example.

In a development during the sending by the RFID reader device of the energizing signal, the method further comprises sending by the RFID reader device another message and receiving said another message by the at least one RFID tag device.

Said another message comprises a command to be transmitted from the reader device to the tag device which enables, for example, handling of a special load condition or special environment condition like the presence of a very high electromagnetic field.

In another development, the method further comprises during converting the energizing signal into energy dynamically adapting an amount of said energy to a load situation present with the at least one RFID tag device and/or to a load situation present within a sensor which can be connected to the RFID tag device.

In order to maximize efficiency and to be compliant with worldwide emission regulations, the generation of energy in the high power mode adjusts to the current load situation within the RFID tag device or within the connectable sensor. The proposed method is consequently self-regulating. It also minimizes the disturbance on other communication systems using the ISM band by enabling easy adaptation of the duration of the energizing signal to local regulations in time and frequency division or time and frequency hopping based RFID systems.

In one embodiment an RFID system has an RFID reader device and at least one RFID tag device. The RFID system is prepared to execute the method as described and defined above.

The RFID reader device is consequently prepared to send the request message, to receive the answer message and send the energizing signal during the adjustable amount of time as detailed above.

The at least one RFID tag device is prepared to receive the request message, to send the answer message and change its state into the high power mode, to receive the energizing signal for the adjustable amount of time, to convert said signal into energy and use the energy and finally to change its state back into the RFID operation mode.

Said system enables a solution for energizing a wireless sensor, i.e. a sensor which can be connected to the at least one RFID device and thereby becoming a wireless sensor, which solution is low cost and very efficient in scavenging energy.

In case the system has two or more RFID tag devices communicating with the RFID reader device, the system also offers the possibility for energizing two or more RFID tag devices, thereby energizing sensors which can be coupled to the RFID tag devices.

In a development the RFID tag device comprises an antenna, an analog frontend circuit which is connected to the antenna, a power management component which is connected to the analog frontend circuit and a logic circuit. The analog frontend circuit is enabled to receive the request message and the energizing signal sent by the RFID reader device and to send the answer message to the RFID reader device through the antenna. The logic circuit is coupled to the analog frontend circuit and to the power management component for respective control thereof. The power management component has a rectifier circuit which is prepared to rectify the energizing signal and therefrom provide the energy.

When starting out from a state of the art RFID tag device, for example a UHF RFID tag device, the analog frontend circuit is adapted to pass the energizing signal received from the RFID reader device to the power management component with its rectifier circuit. Said rectifier circuit is active at least during the high power mode and during the adjustable amount of time rectifies the incoming constant wave as transmitted by the reader device, thereby converting the RF field into a DC voltage and therefrom provide the energy. A rectification component which is present in state of the art RFID tag devices and is employed for generation of energy during the RFID operation mode shall be disabled during the high power mode for higher efficiency of harvesting of energy.

In a development the power management component of the RFID tag device further comprises a charge pump circuit which is connected to the rectifier circuit and is prepared to receive the energy from the rectifier circuit, to convert said energy to a higher level and therefrom provide the energy at the higher level.

Optionally, the charge pump circuit is employed to pump the DC signal derived from the energizing signal in the rectifier component to a higher level. In an exemplary implementation the rectifier component provides the energy in the form of a DC signal at 1.8 V. The charge pump circuit pumps the signal to a level of 3 V.

In a development the power management component of the RFID tag device further comprises a power mode select component which is adapted to configure the analog frontend circuit for the higher power mode or for the RFID operation mode under control of the logic circuit.

The power mode select component configures, for example, the state of modulation transistors employed in modulator and/or demodulator components of the analog frontend circuit for optimizing the amount of energy which is generated during the high power mode.

In a development the power management component of the RFID tag device further comprises a checking component. Said checking component is prepared to measure an amount of power needed by the RFID tag device and/or an amount of power needed by a sensor which can be connected to the RFID tag device and therefrom provides a status signal to the logic circuit. The logic circuit is prepared to configure the power management component according to the status signal.

From the status signal the logic circuit determines, for example, if the charge pump circuit shall be activated in order to provide the energy at a higher level. Consequently, the generation of energy in the high power mode is adapted to the needs of the RFID tag device or a sensor which can be connected to it. In other words, the power management component is adjusted to a load present within the RFID tag device and/or at the connectable sensor, thereby realizing a self-regulating generation of energy. The conversion efficiency is enhanced.

The analog frontend circuit is strongly nonlinear with its input impedance being dependent on an RF input level, i.e. level of the RF field at its antenna and on the load condition. In order to achieve best performances in each condition the power management component adapts to the current load condition and to the input power level.

In an exemplary implementation of the RFID tag device, it can be configured how often the power management component provides the status signal.

BRIEF DESCRIPTION OF THE DRAWINGS

The text below explains the proposed method and corresponding system in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

DETAILED DESCRIPTION

Figure 1:
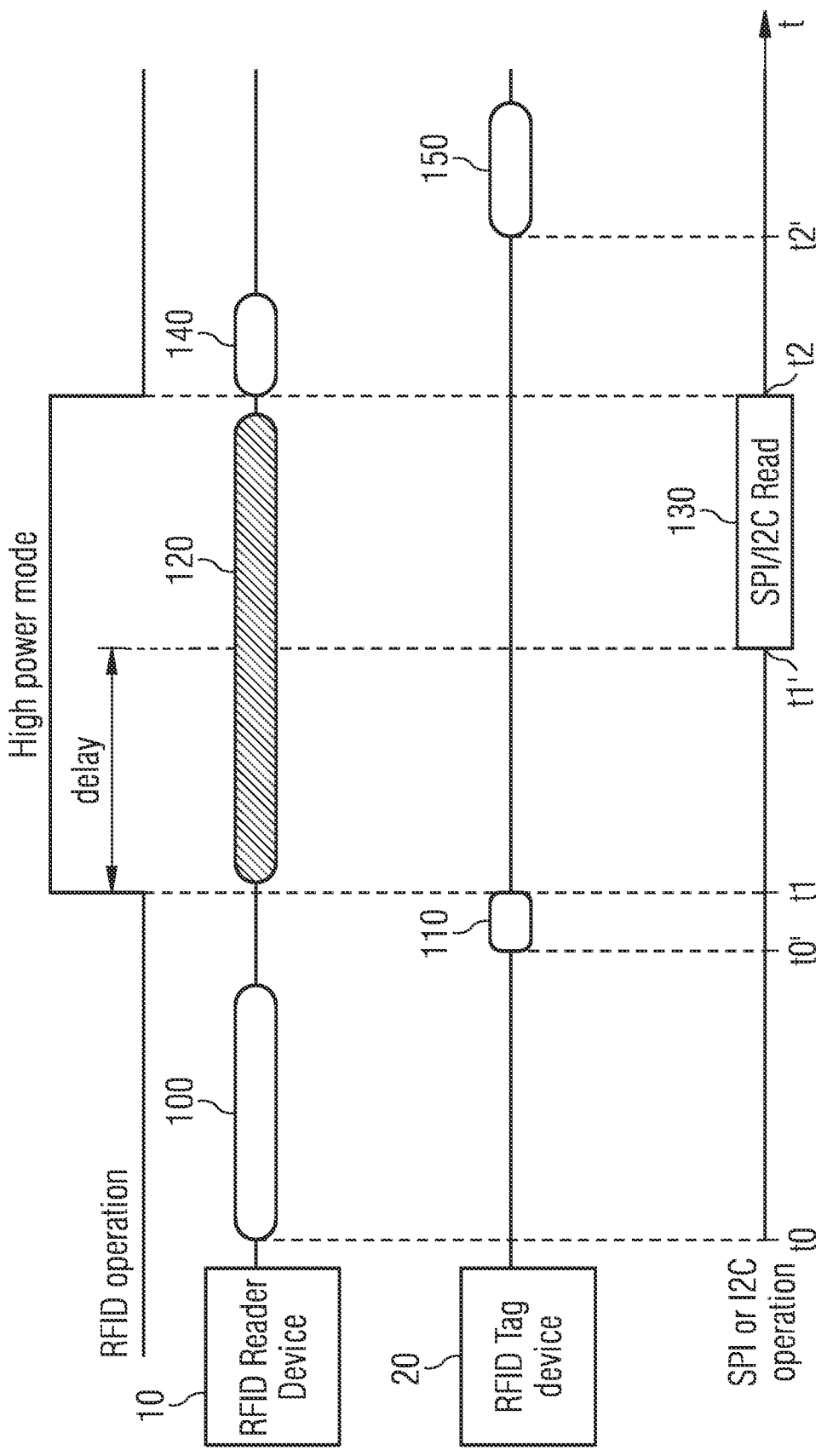
FIG. 1 shows an embodiment example of the proposed method.

FIG. 1 shows an embodiment example of the proposed method. The method is depicted with relation to time t. The first line shows operation modes of an RFID tag device. The second line depicts a message flow at an RFID reader device 10. The third line shows a message flow at the RFID tag device 20. The fourth line depicts optional operation at the RFID tag device 20 using SPI/I²C for interfacing to a connectable sensor.

The method starts out with the RFID tag device 20 being in an RFID operation mode. At point in time t0 the RFID reader device 10 sends a request message 100 to the RFID tag device 20. Upon receipt of the request message 100 the RFID tag device 20 sends an answer message 110 back to the RFID reader device 10 at point in time t0'. Subsequently, at point in time t1 the RFID tag device 20 sets its operation mode or its state into a high power mode as indicated in the first line. Then, the RFID reader device 10 starts emitting an energizing signal 120 which comprises an unmodulated constant wave at a predefined frequency. The energizing signal 120 is sent for an adjustable amount of time between the point in time t1 and a point in time t2. During the point in times t1 and t2 the RFID tag device 20 receives the energizing signal 120, converts said signal 120 into energy and uses said energy. At the end of the adjustable amount of time at point in time t2 the RFID tag device 20 changes its state or mode of operation back into the RFID operation mode enabling state of the art RFID communication according to well-known standards, e.g. UHF RFID.

The above-described request message 100 comprises a first command which causes the RFID tag device 20 to change its state from RFID operation mode into high power mode. The request message 100 further comprises information on the adjustable amount of time during which the energizing signal 120 is emitted by the RFID reader device 10.

FIG. 1 shows the method being executed by a system comprising one RFID reader device 10 and one RFID tag device 20. In further developments it is of course possible that the system has two or more RFID tag devices which receive the request message 100 simultaneously, turn on the high power mode and harvest energy from the energizing signal 120 concurrently.

Optionally, the request message 100 comprises a second command which causes the RFID tag device 20 to perform an operation on a sensor which can be connected to the RFID tag device 20 using an SPI or I²C interface. For example, the second command may contain an SPI or I²C read command and an indication of an amount of time for delaying execution of said second command. According to this option the RFID tag device 20 may perform the requested SPI or I²C read operation 130 according to the second command at point in time t1' and store said data in its own memory e.g. an EEPROM. In the depicted example said operation 130 is delayed until point in time t1'. Data may be read from a connectable sensor via SPI or I²C during the high power mode. After finishing emission of the energizing signal 120, the RFID reader device 10 sends a read request message 140 comprising a read memory command shortly after point in time t2. In response to the request message 140, the RFID tag device 20 transmits the SPI or I²C data which had been meanwhile stored in its memory, e.g. EEPROM, by way of answer message 150.

Figure 2:
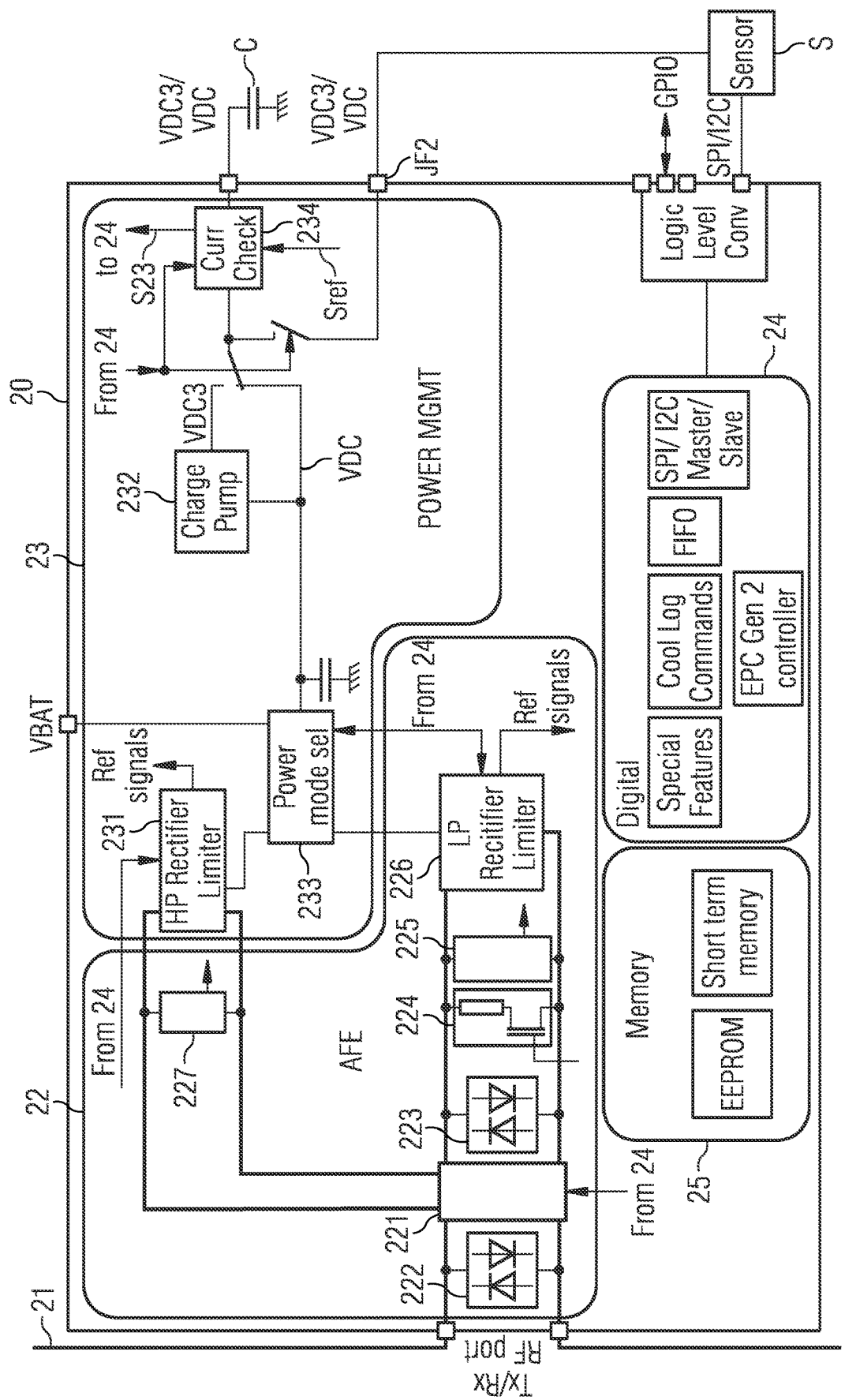
FIG. 2 shows a first embodiment example of an RFID tag device to be employed in the proposed system.

FIG. 2 shows a first embodiment example of an RFID tag device to be employed in the proposed system. The RFID tag device 20 comprises an antenna 21, an analog frontend circuit 22, a power management component 23, and a logic circuit 24. Optionally, the tag device 20 also has a memory component 25. The antenna 21 is connected to the analog frontend circuit 22 which in turn is connected to the power management component 23. The logic circuit 24 is coupled to the analog frontend circuit 22, the power management component 23 and optionally to the memory component 25 for respective control of said components.

FIG. 2 also shows a sensor S which can be connected to respective ports of the RFID tag device 20. The sensor S is connected to the RFID tag device 20 via SPI/I²C for data and command exchange and via a second interface IF2 for supply of energy. Also, an energy storage device, in the form of a capacitor C, is shown which can be connected to the RFID tag device 20 in addition to the sensor S.

The antenna 21 is suitable for communication in the ISM band. For operation during the RFID operation mode, the RFID tag device 20 has the required components as known to those skilled in the art, said components being depicted in an exemplary manner without making a claim to be complete. The analog frontend circuit 22 for operation in the high power and in the RFID operation mode may have an electrostatic discharge component 222. Furthermore, for operation in the RFID operation mode the analog frontend circuit 22 may further have a limiter component 223, a modulator component 224, a demodulator component 225 and a low power rectifier 226. The limiter component 223, the modulator component 224, the demodulator component 225 and the low power rectifier 226 together form a signal path for signals occurring during the RFID operation mode. This means that request messages received from an RFID reader device which conform to, for example, the UHF RFID standard, and corresponding answer messages are handled in this signal path. The low power rectifier 226 is implemented by a multi-stage rectifier, for example.

In addition to an analog frontend circuit as known to those skilled in the art, the depicted analog frontend circuit 22 comprises a frontend mode select component 221 which selectively activates the just described signal path used during the RFID operation mode or another signal path to be detailed in the following which is activated during the high power mode under control of the logic circuit 24. During the high power mode the frontend mode select component 221 disables the state of the art signal path of the RFID operation mode and passes the signal received via the antenna 21 directly to the power management component 23, i.e. the energizing signal is directly passed on to a rectifier circuit 231 of the power management component 23.

Optionally, the analog frontend circuit 22 comprises a demodulator 227 which enables demodulation of commands sent by the RFID reader device during the high power mode.

The power management component 23 comprises the rectifier circuit 231, a charge pump circuit 232, a power mode select component 233 and a checking component 234. The power mode select component 233 is coupled to the rectifier circuit 231 and to the low power rectifier 226. The power mode select component 233 is adapted to configure the analog frontend circuit 22 for the high power mode or the RFID operation mode under control of the logic circuit 24. In other words, the power mode select component 233 either activates the rectifier circuit 231 during the high power mode or it activates the low power rectifier 226 during normal RFID operation mode. Consequently, during high power mode the energizing signal is received by the antenna 21, passed through the analog frontend 22 and gets rectified in the high power rectifier circuit 231. The rectifier circuit 231 is implemented by a highly efficient single rectification stage, for example. The energy converted from this rectifying process is provided, for instance in the form of a DC voltage VDC. An exemplary level of said DC voltage VDC may be 1.8 V. Said energy in the form of the voltage VDC is provided either to the connectable capacitor C or to the connectable sensor S. Optionally, the charge pump circuit 232 pumps the level of the voltage VDC to a higher level, for instance 3 V and therefrom provides a higher level voltage VDC3. The checking component 234 is prepared to measure an amount of power needed by the RFID tag device 20 and/or an amount of power needed by the sensor S and therefrom provide a status signal S23 to the logic circuit 24. Depending on the status signal S23 the logic circuit 24 configures respective switches in order to enable the charge pump circuit 232 and provide the high level voltage VDC3 to the sensor S or capacitor C or to disable the charge pump circuit 232 and directly provide the voltage VDC to capacitor C or sensor S. For providing the status signal S23 the checking component 234 may use a reference signal Sref for comparison to the measured amount of power needed. Additionally to providing energy in the form of the voltage VDC or VDC3 to the sensor S, said energy is supplied to the capacitor C and stored there.

The memory component 25 comprises state of the art memory, for instance an EEPROM. The logic circuit 24 comprises in addition to components required for implementing the control function in the proposed method off the shelf, known components for realizing interface operation and UHF RFID protocol in a standard compliant manner. For example, an SPI/I²C master/slave component is provided and an EPC Gen2 controller for standard compliant protocol handling.

Figure 3:
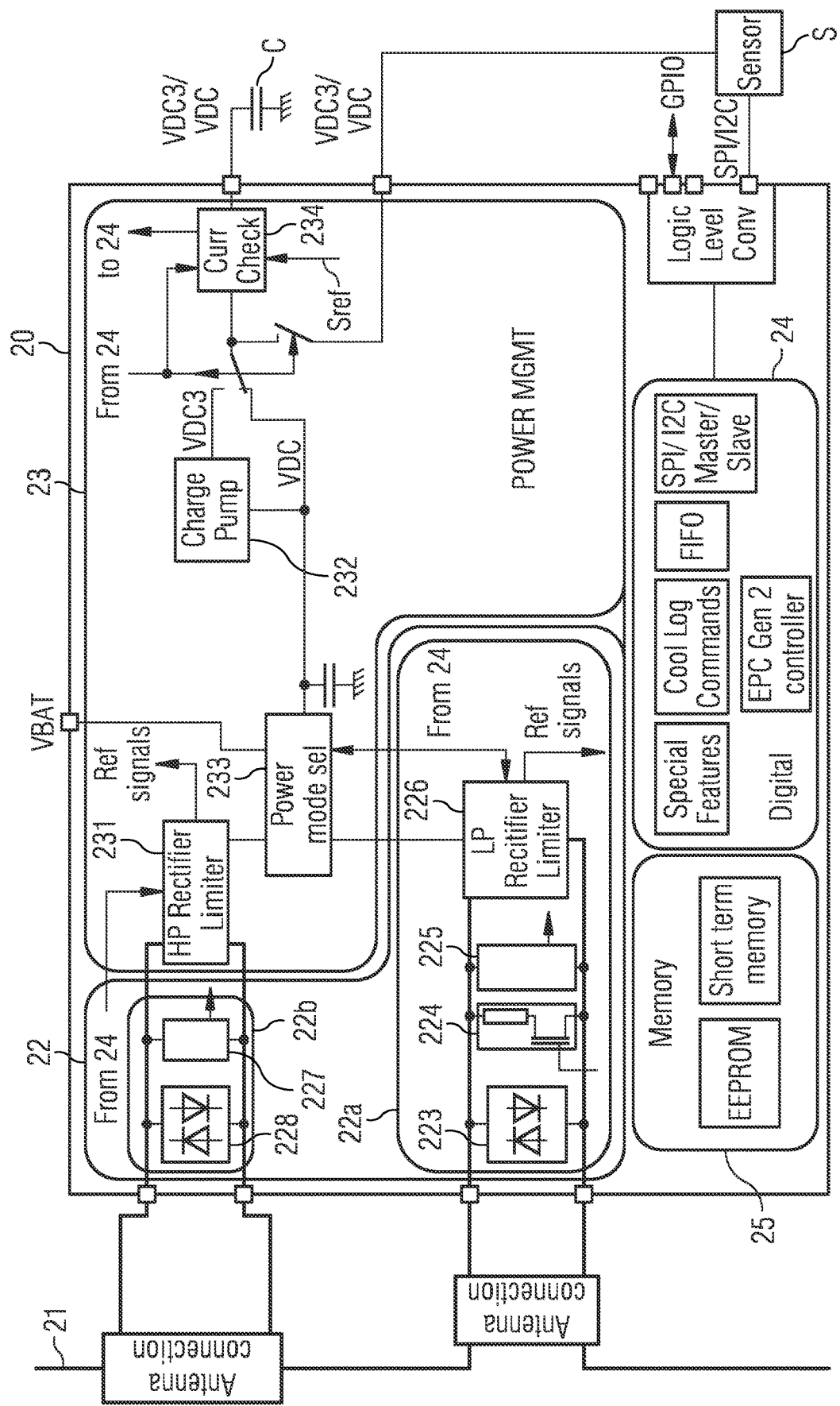
FIG. 3 shows a second embodiment example of an RFID tag device to be employed in the proposed system.

FIG. 3 shows a second embodiment example of an RFID tag device to be employed in the proposed system. The embodiment depicted in FIG. 3 coincides with the embodiment depicted in FIG. 2 except for the implementation of the analog frontend circuit 22. In FIG. 3 the analog frontend circuit 22 is implemented with two separate antenna connections for a low power frontend 22a and a high power frontend 22b. The limiter component 223, the modulator component 224, the demodulator component 225, and the low power rectifier 226 form the lower power frontend 22a. The high power frontend 22b has the demodulator 227 and a high power limiter 228. The logic circuit 24 either activates the lower power frontend 22a during the RFID operation mode or it activates the high power fronted 22b during the high power mode. The two frontend parts 22a, 22b have separate connections, as shown in FIG. 3, to the same antenna 21.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the method and corresponding system which are defined in the accompanying claims.

The invention claimed is:

1. A method for supplying energy wirelessly by means of Radio Frequency Identification, RFID, comprising the steps of
sending by an RFID reader device a request message to at least one RFID tag device,
receiving by the at least one RFID tag device while being in an RFID operation mode the request message,
sending by the at least one RFID tag device while being in the RFID operation mode an answer message to the RFID reader device and changing a state of the at least one RFID tag device into a high power mode,
receiving by the RFID reader device the answer message,
sending by the RFID reader device an energizing signal having an unmodulated constant wave at a predefined frequency during an adjustable amount of time,
receiving by the at least one RFID tag device the energizing signal, converting said signal into energy and using the energy by the at least one RFID tag device,
changing the state of the at least one RFID tag device into the RFID operation mode at the end of the adjustable amount of time,
wherein the request message comprises a first command which causes the state of the at least one RFID tag device to change into the high power mode, and
wherein the request message further comprises information on the adjustable amount of time for the sending of the energizing signal.

2. The method according to claim 1,
wherein the request message comprises a second command which causes the at least one RFID tag device to perform an operation on a sensor which can be connected to the RFID tag device, and wherein the method further comprises the step of performing by the at least one RFID tag device the operation according to the second command.

3. The method according to claim 1,
wherein the answer message comprises an acknowledgement signifying successful receipt of the request message.

4. The method according to claim 1,
wherein using the energy by the at least one RFID tag device comprises storing the energy in an energy storage device which can be connected to the at least one RFID tag device and/or providing the energy to a sensor which can be connected to the RFID tag device.

5. The method according to claim 1,
wherein the sending by the RFID reader device the energizing signal comprises changing a transmission mode of the RFID reader device into a constant wave mode, turning on an RFID carrier signal in the RFID reader device and emitting said carrier signal representing the energizing signal.

6. The method according to claim 1,
wherein the converting the energizing signal into energy comprises rectifying the energizing signal and providing a direct current signal from this rectifying.

7. The method according to claim 1,
wherein during the sending by the RFID reader device of the energizing signal the method further comprises sending by the RFID reader device another message and receiving said another message by the at least one RFID tag device.

8. The method according to claim 1, further comprising during converting the energizing signal into energy, dynamically adapting an amount of said energy to a load situation present within the RFID tag device and/or to a load situation present within a sensor which can be connected to the RFID tag device.

9. An RFID system having an RFID reader device and at least one RFID tag device, wherein the RFID system is operable to execute the method according to claim 1.

10. The RFID system according to claim 9,
wherein the RFID tag device comprises
an antenna,
an analog front end circuit which is connected to the antenna and is enabled to receive the request message and the energizing signal sent by the RFID reader device and to send the answer message to the RFID reader device using the antenna,
a power management component which is connected to the analog front end circuit, and
a logic circuit which is coupled to the analog front end circuit and the power management component for respective control thereof,
wherein the power management component has a rectifier circuit which is prepared to rectify the energizing signal and therefrom provide the energy.

11. The RFID system according to claim 10,
wherein the power management component of the RFID tag device further comprises a charge pump circuit which is connected to the rectifier circuit and is prepared to receive the energy from the rectifier circuit convert said energy to a higher level and therefrom provide the energy at the higher level.

12. The RFID system according to claim 10,
wherein the power management component of the RFID tag device further comprises a power mode select component which is adapted to configure the analog front end circuit for the high power mode or the RFID operation mode under control of the logic circuit.

13. The RFID system according to claim 10,
wherein the power management component of the RFID tag device further comprises a checking component which is prepared to measure an amount of power needed by the RFID tag device and/or an amount of power needed by a sensor which can be connected to the RFID tag device and therefrom provide a status signal to the logic circuit, and
wherein the logic circuit is prepared to configure the power management component according to the status signal.

* * * * *